United States Patent
Pai et al.

(10) Patent No.: US 7,143,212 B1
(45) Date of Patent: Nov. 28, 2006

(54) MODEM DATA TRANSFER FUNCTION WHEREIN CODE IS DOWNLOADED DURING INACTIVITY INTERVALS WHEREIN DATA TRANSFER FUNCTION IS SUSPENDED

(75) Inventors: Pratima Pai, Singapore (SG); Godfrey Da Costa, Singapore (SG); Foo Yuen Leong, Singapore (SG)

(73) Assignee: STMicroelectronics Asia Pacific (PTE) Ltd., Singapore (SG)

( * ) Notice: Subject to any disclaimer, the term of this patent is extended or adjusted under 35 U.S.C. 154(b) by 0 days.

(21) Appl. No.: 09/830,435

(22) PCT Filed: Oct. 26, 1998

(86) PCT No.: PCT/SG98/00086
§ 371 (c)(1),
(2), (4) Date: Jun. 11, 2001

(87) PCT Pub. No.: WO00/25206
PCT Pub. Date: May 4, 2000

(51) Int. Cl.
*G06F 3/00* (2006.01)
*H04B 1/38* (2006.01)

(52) U.S. Cl. .................. 710/58; 375/222; 709/229; 709/233

(58) Field of Classification Search ............ 710/58; 375/222; 709/229, 233
See application file for complete search history.

(56) References Cited

U.S. PATENT DOCUMENTS
6,570,911 B1* 5/2003 O'Mahony .................. 375/222

FOREIGN PATENT DOCUMENTS
EP     0 772 370 A2     5/1997

OTHER PUBLICATIONS
Ho, W. et al., "An Approach to Genuine Dynamic Linking," *Software Practice & Experience*, 21(4)375-390, Oct. 19, 1990.

* cited by examiner

*Primary Examiner*—Tammara Peyton
(74) *Attorney, Agent, or Firm*—Lisa K. Jorgenson; Robert Iannucci; Seed IP Law Group PLLC

(57) ABSTRACT

A modem architecture and a method of reducing on-chip memory requirements in a downloadable modem architecture are provided. The preferred architecture consists of a Digital Signal Processor (DSP) (6) with on-chip Random Access Memory (RAM) (12). A procedure which exploits inactivity intervals in a modem modulation function is provided. The procedure dynamically downloads the requisite code segments for each phase of the function from a cheaper, slower external memory (14) into the DSP on-chip RAM during inactivity intervals, thereby reducing the DSP on-chip RAM requirements.

19 Claims, 2 Drawing Sheets

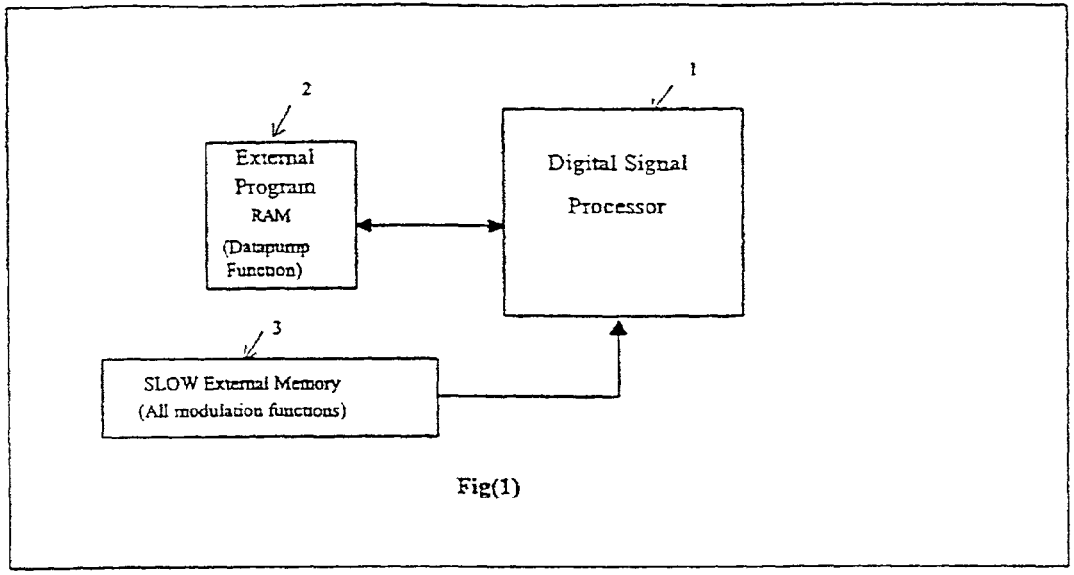
Fig(1)
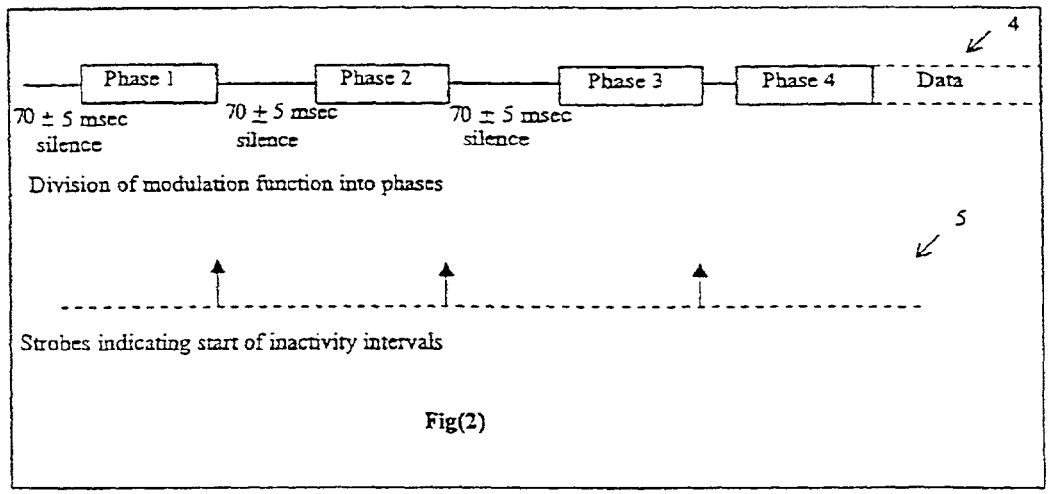

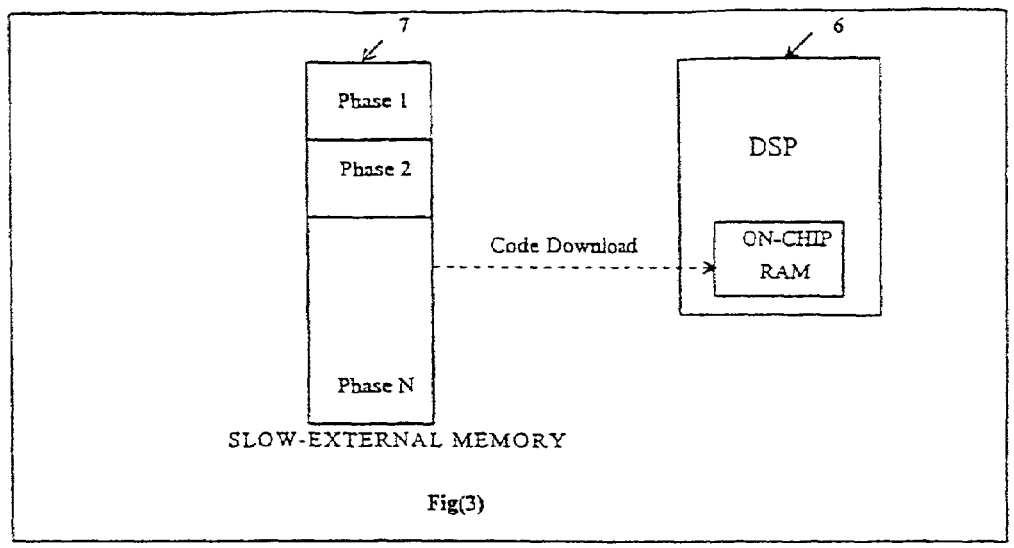
Fig(3)
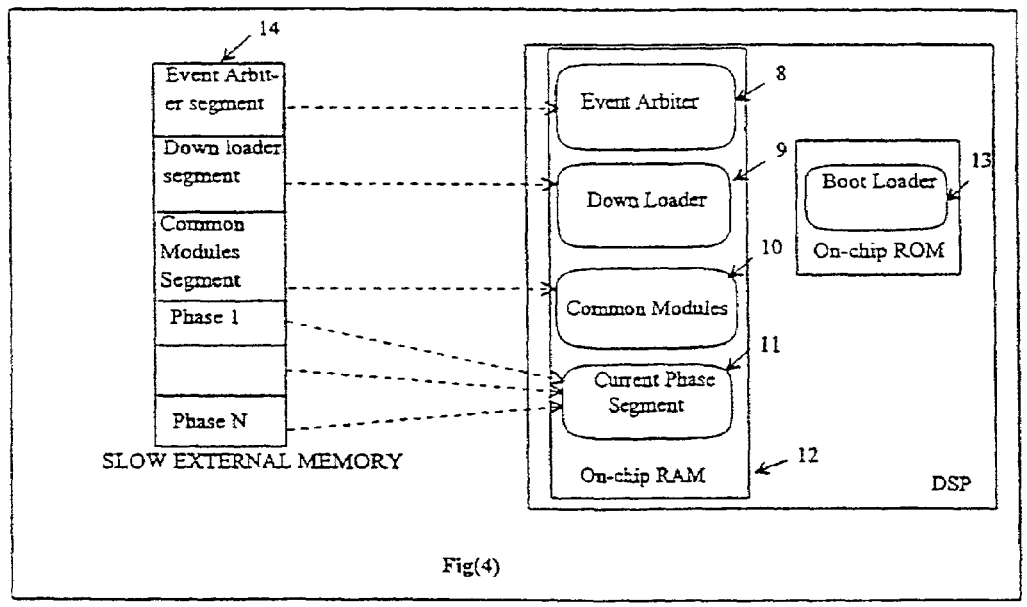
Fig(4)

MODEM DATA TRANSFER FUNCTION WHEREIN CODE IS DOWNLOADED DURING INACTIVITY INTERVALS WHEREIN DATA TRANSFER FUNCTION IS SUSPENDED

FIELD OF THE INVENTION

The present invention relates to modem architecture and a method of data transfer for reducing on-chip Random Access Memory in a signal processor of a modem.

BACKGROUND OF THE INVENTION

Typical Modem Architectures consist of a Controller, a Datapump and hardware circuitry also called the Direct Access Arrangement (DAA), to connect to a telephone network. The Controller implements Error Control, Data Compression and digital terminal equipment (DTE) Command/Response interface.

The Datapump is arranged to perform a Datapump function which is usually specified by one of the modem standards ratified by national/international standardisation bodies, which is henceforth referred to as a Modulation function. The specific Datapump function in operation in a modem can be one of a number of Modulation functions. The Modulation functions are usually divided into phases called the Handshake phase and the Data phase. The Handshake phase pertains usually to protocol negotiation (like V.8, V.8bis), channel probing (measurement of channel characteristic), training of modem adaptive elements, and communication of modem parameters. Upon completion of the Handshake Phase, the modem enters the Data phase. These phases are usually separated by inactivity intervals.

The Datapump function (Modulation function in operation) transmits/receives data from a remote modem. The Datapump function usually requires a Digital Signal Processor (DSP) to perform the various numerical operations required for signal generation and reception. Some applications use the DSP power to accommodate the Controller function.

DSP based systems perform numerical operations on data and are optimised for such operations. A bottleneck in extracting the maximum performance is the limitation imposed by access times to memory. This is usually circumvented by providing on-chip RAM/ROM to supplement the basic DSP core. ROM based solutions preclude upgradability. Downloadable Modem architectures employ on-chip RAM for easy upgradability. This on-chip RAM is expensive compared to slower external memories like SDRAM, Flash etc.

A typical Datapump function has significant internal memory requirements. A straightforward implementation leads to an expensive single chip solution for Downloadable Modem architectures. This implies a large on-chip RAM requirement if all the program code corresponding to the Handshake and Data phase of the Modulation function were loaded in on-chip RAM.

An alternative is to provide program code for the Modulation function in external RAM, in order to free up on-chip memory and minimise costs for a single chip DSP. FIG. 1 is an example of such an architecture, as used in current Modem application systems. The DSP 1 performs the Datapump function. The program code for the specific Modulation function used during a modem connection exists in external RAM 2. A slow external memory 3 stores the program code for the whole modem application. This slow external memory 3 is usually a FLASH memory, and is provided as a feature for code-version upgradability. Depending on the Modulation function used, the program code for the Datapump function is loaded into external RAM 2. The memory requirements of this Modulation function code is high because the entire code corresponding to this function is loaded. A significant problem associated with the architecture of FIG. 1 is that execution of the modulation function is slowed, as compared to an on-chip DSP RAM architecture, due to the external RAM being generally slower and interfacing delays between the DSP chip and the external RAM. The present invention seeks to maximise efficiency of the DSP operation by utilizing timing constraints of operations performed by the DSP.

An example of dynamically loading or unloading tasks into instruction RAM is disclosed in EP 0 772 370. However that reference makes no mention of any timing constraints for the downloading operations performed by the DSP manager. That is likely because the downloading scheme does not require it. The ability of the DSP manager to allocate space in the data RAM in response to a request from a DSP task does not necessarily imply that inactivity timing constraints are utilized. This is because allocating space in data RAM is different from a downloading operation, it does not involve the transfer of program code from the external PC RAM to the DSP RAM.

OBJECT OF THE INVENTION

It is an object of the invention to provide an architecture and data transfer method to reduce on-chip RAM requirements in a DSP particularly, but not exclusively, in a modem whilst maintaining efficiency.

SUMMARY OF THE INVENTION

In one broad aspect of the invention, there is provided a method of data transfer for use with a signal processor of a modem, including: establishing a program code for executing a data transfer function, the function being divided into phases by inactivity intervals, and the program code including code segments associated with each phase; and downloading each code segment to a memory of the processor prior to commencement of the respective phase for execution thereof, characterised in that: each code segment is downloaded only during the associated inactivity interval.

Preferably, each successively downloaded segment overwrites a previously downloaded segment.

In another aspect, there is provided a modem architecture including: a signal processor with a first internal memory; a second memory external of the signal processor, wherein the second memory is arranged to hold a program code divided into code segments, for executing phases of a modulation function with inactivity intervals therebetween and the first memory is configured to sequentially receive the segments downloaded from the second memory to a current segment portion of the first memory for executing same; characterised in that the modem architecture is programmed to perform the method steps, as described above.

Preferably, the signal processor is a Datapump and the first memory is provided as on-chip RAM of the Datapump.

In a more particular embodiment of the invention a Downloadable architecture is proposed which subdivides the Modulation function into phases separated by inactivity intervals. The program code segments corresponding to these phases are dynamically downloaded to on-chip RAM during the inactivity intervals without affecting the performance of the modem.

BRIEF DESCRIPTION OF THE DRAWINGS

The invention is more fully described, by way of non-limiting example only, with reference to the accompanying drawings, in which:

FIG. 1 is a diagrammatic representation of a prior art Modem Datapump implementation;

FIG. 2 is a diagrammatic representation of a subdivision of a Modulation Function into phases;

FIG. 3 is an exemplary diagram of a single chip DSP downloadable architecture, in accordance with the invention; and FIG. 4 is a detailed diagram of the single chip DSP downloadable architecture of FIG. 3.

DETAILED DESCRIPTION OF AN EMBODIMENT OF THE INVENTION

The invention utilises a Modulation function which is subdivided into different phases as shown in FIG. 2. These phases are subdivided such that there is an inactivity interval between them. FIG. 2 shows the typical phases through which a Modulation function passes through. The arrowheads 5 indicate the start of the inactivity interval. The program code for executing each phase is likewise separated into code segments (not shown), associated with each respective phase. The code segments are downloaded dynamically depending on the current phase of the Modulation function, to a DSP on-chip RAM of a Modem.

FIG. 3 illustrates the proposed single chip DSP Downloadable Modem architecture. It consists of a DSP with on-chip program RAM 6. The different program segments which are to be downloaded into the on-chip RAM are stored in the slow external second memory 7.

FIG. 4 presents a detailed view of the proposed Downloadable Modem architecture. A Bootloader 13 which is resident in on-chip ROM, on start-up or reset, loads an Event Arbiter Segment, Down Loader Segment, and Common Modules Segment from slow external memory 14 into the on-chip RAM 12. The initialisations of the modem system are performed by code executing from the Common Modules Segment 10. The Event Arbiter 8 monitors the current phase of the modem connection and on successful completion of the phase, requests the Down Loader 9 to download the program code segment for the next phase from slow external memory 14 into the Current Phase Segment portion 11. The Current Phase Segment code for the next phase is downloaded into on-chip DSP RAM and executed. The sequence of events that occur is further detailed using an example of a modem connection, as follows.

On start-up the Boot-loader 13, loads the modules common to all phases into the Common Modules 10. The initialisation for the modem is then performed. Depending upon the modulation function selected, Phase 1 of that modulation function is downloaded from slow external memory 14. After successful completion of Phase 1, the Event Arbiter 8 requests the Down Loader 9 to download Phase 2 from external memory into 14 the Current Phase Segment portion 11. The copied code corresponding to Phase 2 of the Datapump function overlays the existing code corresponding to Phase 1 of the Datapump function. The download operation takes place during the inactivity interval which exists between the termination of Phase 1 and the commencement of Phase 2. Phase 2 is then executed. After successful completion of Phase 2 the Event Arbiter 8 requests the Down Loader 9 to download Phase 3 from slow external memory 14 into the Current Phase segment 11. The Current Phase Segment 11 thus has Phase 2 replaced by Phase 3. The download operation takes place during the inactivity interval which exists between the termination of Phase 2 and the commencement of Phase 3. The program for Phase 3 is then executed. This methodology is followed for the subsequent Phases of the Datapump function.

The total on-chip RAM 12 requirements includes that which is required by the Event Arbiter 8, Down Loader 9, Common Modules 10 and the Current Phase Segment 11. The memory requirements for the Current Phase Segment portion 11 is the maximum of the memory requirements of the individual phases. Thus subdivision of the Modulation Function into phases and overlaying of the code corresponding to the different Phases leads to a substantial reduction in on-chip RAM requirements in single chip DSP downloadable modem architectures.

This procedure easily incorporates inclusion of other applications by modifying the Event Arbiter 8. The new application can be loaded into the Current Phase Segment 11 when necessary. Hence a provision for integration of multiple applications which can be non-concurrently executed by the DSP is provided by this scheme. This ease in integration increases the DSP on-chip RAM requirements marginally by following the code overlay procedure for these multiple applications.

The mandatory requirement for this code overlay procedure which leads to a substantial decrease in DSP on-chip memory is the existence of inactivity intervals. Also the time required for the largest program code download should be within the duration of the inactivity intervals. Hence appropriate external slow memories which meet the latency requirements should be selected. This is exemplified by the equations given below.

The memory size of the Current Phase Segment 10 $S_{max}$ is given by $$S_{max} = \max(S_i)$$

where, $S_i$ is the size of the $i^{th}$ Phase in words

The following inequality should be satisfied;

$$(T_{Acc\_int} + T_{Acc\_ext} + T_{Inst\_exec}) * S_i + T_{Margin} \leq T_i$$

where, $T_{Acc\_ext}$ is the slow external memory access time $T_{Acc\_int}$ is the on-chip RAM access time $T_{Inst\_exec}$ is the DSP instructions execution overhead for each word transfer $T_{margin}$ is the overhead for executing the Down Loader $T_i$ is the inactivity interval for the $i^{th}$ Phase This invention outlines a downloadable implementation for modem architectures which are amenable for implementation of these download procedures. Hence it is possible to achieve significant reduction in the DSP on-chip memory requirements.

The present invention provides a significant reduction in cost for single chip DSP solutions for downloadable modem applications. It outlines the procedures for downloadable implementation of the low cost single chip DSP solutions for modem applications. It also provides easy downloadability for other applications which can be executed by the DSP non-concurrently.

The above modem architecture and method has been described by way of non-limiting example only and many modifications and variations may be made thereto without departing from the spirit and scope of the invention.

The invention claimed is:

1. A method of data transfer for use with a signal processor of a modem, comprising:
   establishing a program code for executing a data transfer function, the function being divided into phases by inactivity intervals, and the program code including code segments respectively associated with the phases; and
   downloading each code segment to a first memory of the processor prior to commencement of the respective phase for execution thereof, each code segment being downloaded during one of the inactivity intervals prior to the commencement of the respective phase.

2. A method as claimed in claim 1, wherein each successively downloaded segment overwrites a previously downloaded segment.

3. A method as claimed in claim 1, wherein the data transfer function is a modem modulation function.

4. A method as claimed in claim 1, wherein the program code is held in a second memory, external of the signal processor.

5. A method as claimed in claim 1, wherein the signal processor is in the form of a Datapump.

6. A modem architecture comprising:
   a signal processor with an internal first memory;
   a second memory external of the signal processor, wherein the second memory is arranged to hold a program code divided into code segments, for executing phases of a modulation function with inactivity intervals therebetween and the first memory is configured to sequentially receive the segments downloaded from the second memory to a current segment portion of the first memory for executing same;
   wherein the signal processor is programmed to establish a program code for executing a data transfer function, the function being divided into phases by inactivity intervals, and the program code including code segments associated with each phase; and download each code segment to the first memory of the signal processor prior to commencement of the respective phase for execution thereof, each code segment being downloaded only during an associated inactivity interval.

7. A modem architecture as claimed in claim 6, wherein the signal processor is a Datapump and the first memory is provided as on-chip RAM of the Datapump.

8. A method of data transfer for use with a signal processor, comprising:
   establishing a program code for executing a data transfer function, the function being divided into phases by inactivity intervals, and the program code including code segments associated with each phase; and
   downloading each code segment to a first memory of the processor prior to commencement of the respective phase for execution thereof, wherein each successively downloaded segment overwrites a previously downloaded segment, and wherein the program code is downloaded from a second memory, external to the signal processor.

9. The method of claim 8, wherein the data transfer function is a modem modulation function.

10. The method of claim 8, wherein the signal processor is a Datapump.

11. The method of claim 8, further comprising downloading from the second memory to the first memory an event arbiter segment prior to downloading any segments of the program code, the event arbiter segment providing programming that causes the signal processor to detect when each inactivity interval begins.

12. The method of claim 11, further comprising downloading from the second memory to the first memory a downloader segment prior to downloading any segments of the program code, the downloader segment providing programming that causes the signal processor to download one of the code segments in response to detecting the beginning of one of the inactivity intervals.

13. A method of data transfer for use with a signal processor of a modem, comprising:
   establishing a program code for executing a data transfer function, the function being divided into phases by inactivity intervals, and the program code including code segments associated with each phase; and
   downloading each code segment to a first memory of the processor from a second memory, external to the processor, prior to commencement of the respective phase for execution thereof, each code segment being downloaded during an associated inactivity interval.

14. The method of claim 13, wherein the signal processor is a Datapump and the first memory is provided as on-chip RAM of the Datapump.

15. The method of claim 13, wherein the data transfer function is a modem modulation function.

16. The method of claim 13, further comprising:
   downloading a downloader segment from the second memory to the first memory, wherein the step of downloading each code segment includes using the downloaded downloader to download each code segment.

17. The method of claim 1, further comprising:
   downloading a downloader segment from an external second memory to the first memory, wherein the step of downloading each code segment includes using the downloaded downloader to download each code segment.

18. A modem architecture as claimed in claim 6, wherein the signal processor is structured to download a downloader segment from the second memory to the first memory and the downloaded downloader is structured to download the program code segments.

19. The method of claim 8, further comprising:
   downloading a downloader segment from the second memory to the first memory, wherein the step of downloading each code segment includes using the downloaded downloader to download each code segment.

* * * * *